No. 627,568. Patented June 27, 1899.
J. H. BROOKMAN & C. S. BLACKMAR.
NUT LOCK.
(Application filed Sept. 27, 1898.)
(No Model.)
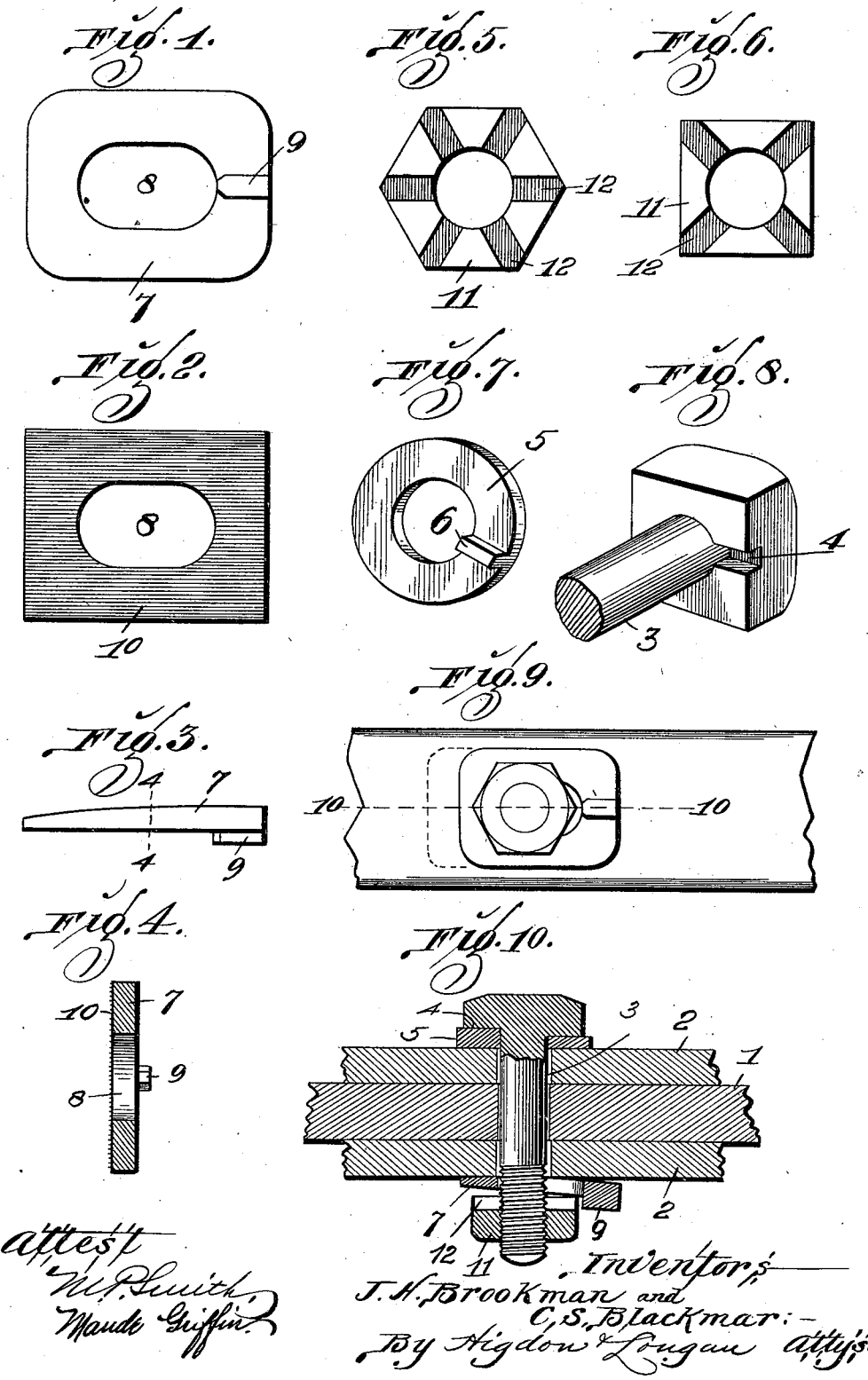

UNITED STATES PATENT OFFICE.

JOHN H. BROOKMAN AND CHARLES S. BLACKMAR, OF NEW FRANKLIN, MISSOURI.

NUT-LOCK.

SPECIFICATION forming part of Letters Patent No. 627,568, dated June 27, 1899.

Application filed September 27, 1898. Serial No. 692,042. (No model.)

*To all whom it may concern:*

Be it known that we, JOHN H. BROOKMAN and CHARLES S. BLACKMAR, of the city of New Franklin, Howard county, Missouri, have invented certain new and useful Improvements in Nut-Locks, of which the following is a full, clear, and exact description, reference being had to the accompanying drawings, forming a part hereof.

Our invention relates to nut-locks; and it consists of the novel construction, combination, and arrangement of parts hereinafter shown, described, and claimed.

Figure 1 is a front elevation of a washer made use of in our improved nut-lock. Fig. 2 is a rear elevation thereof. Fig. 3 is an edge view of the washer. Fig. 4 is a vertical sectional view taken approximately on the line 4 4 of Fig. 3. Figs. 5 and 6 are elevations of the nuts made use of in carrying out our invention. Fig. 7 is a view in perspective of the washer that is located beneath the head of the bolt. Fig. 8 is a view in perspective of the head of the bolt. Fig. 9 is an elevation of a section of the fish-plate having our improved nut-lock in position thereon. Fig. 10 is a horizontal sectional view taken approximately on the line 10 10 of Fig. 9.

Referring by numerals to the accompanying drawings, 1 indicates a portion of a rail, the meeting edges of which are joined by the fish-plates 2, through which fish-plates and rail passes the usual bolt 3. Formed in the under side of the head of this bolt 3 is a recess 4, and a washer 5, that is intended to be located between the fish-plate and this bolt-head, is provided with a lug 6, that engages in said recess 4.

7 indicates a washer that is located between the nut and the fish-plate on the screw-threaded end of the bolt, said washer being in the form of a rectangular plate, one end thereof being thinner than the opposite end, thus making said plate slightly wedge-shaped, and said plate is provided with an elongated aperture 8, and upon the front face of said plate, at one end of said aperture, is a horizontally-arranged lug 9. The rear face of this plate or washer is corrugated or feathered, as indicated by 10.

If desired, the rear face of the washer 5 may be corrugated or feathered in the same manner as is the inner face of the washer or plate 7.

The nut 11 made use of in carrying out our invention is provided on its inner face with a series of radially-arranged grooves 12.

In the use of our improved nut-lock the shank of the bolt 3 is passed through the washer 5 and through the coinciding apertures in the fish-plates and rail, and when properly positioned the corrugated face of the washer engages against the outer face of one of the fish-plates, and the lug 6, carried by said washer, is seated in the recess 4 in the head of the bolt. The washer or plate 8 is passed over the screw-threaded end of the bolt, with the corrugated or feathered face 10 thereof against the outer face of the fish-plate, and said washer or plate is moved laterally to bring the thin end of said washer to a point immediately beneath the nut, and by so doing the lug 9 is moved out of the path of travel of the edges of said nut. The nut is now manipulated upon the screw-threaded end of the bolt until it bears against the outer face of the washer or plate 7, and said nut is finally brought into such a position as that one of the grooves in the inner face thereof is in alinement with the lug 9. By means of a suitable tool and hammer the washer or plate 7 is now forced laterally beneath the nut, and in so doing the thicker portion of said washer or plate is brought into a position beneath the nut and at the same time the lug 9 is positioned in one of the grooves 12 in said nut 11. When the washer or plate 7 is forced beneath the nut 11, the corrugations or feathers on the inner face of said washer or plate will grip the face of the fish-plate, and thus the washer or plate is locked to the face of the fish-plate and the nut is locked upon said washer.

A nut-lock of our improved construction possesses superior advantages in point of simplicity, durability, and general efficiency and is applicable for both metal and wood work.

We claim—

1. A nut-lock, constructed with a bolt, a nut constructed to be located on the screw-threaded end of said bolt, in the inner face of which nut is formed a plurality of radially-arranged grooves, and a wedge-shaped washer constructed with an elongated aperture, a lug formed integral with the outer face of said washer at one end of the aperture, and the rear face of said washer being feathered, substantially as specified.

2. A nut-lock constructed with a bolt, in the under side of the head of which is formed a recess, a washer having a feathered inner face and provided on its outer face with an integral lug that engages in the recess in the bolt-head, a nut arranged to be located on the screw-threaded end of the bolt and provided in its inner face with a plurality of radially-arranged grooves, and a wedge-shaped washer constructed with an elongated aperture, the inner face of said washer being feathered, and a lug integral with the outer face of said washer at one end of the aperture therein, substantially as specified.

In testimony whereof we affix our signatures in presence of two witnesses.

JOHN H. BROOKMAN.
CHARLES S. BLACKMAR.

Witnesses:
EDWARD E. LONGAN,
M. P. SMITH.